(12) United States Patent
Razavi Majomard et al.

(10) Patent No.: US 10,771,100 B1
(45) Date of Patent: Sep. 8, 2020

(54) METHOD AND APPARATUS FOR EFFICIENT FAST RETRAINING OF ETHERNET TRANSCEIVERS

(71) Applicant: Aquantia Corporation, San Jose, CA (US)

(72) Inventors: Seid Alireza Razavi Majomard, San Carlos, CA (US); Hossein Sedarat, San Jose, CA (US); Dragan Labalo, San Jose, CA (US)

(73) Assignee: Marvell Asia Pte., LTD., Singapore (SG)

(*) Notice: Subject to any disclaimer, the term of this patent is extended or adjusted under 35 U.S.C. 154(b) by 0 days.

(21) Appl. No.: 16/362,494

(22) Filed: Mar. 22, 2019

(51) Int. Cl.
H04B 1/12 (2006.01)
H04B 1/40 (2015.01)

(52) U.S. Cl.
CPC ............. *H04B 1/12* (2013.01); *H04B 1/40* (2013.01)

(58) Field of Classification Search
CPC ................................. H04B 1/12; H04B 1/40
USPC ........................................................ 375/346
See application file for complete search history.

(56) References Cited

U.S. PATENT DOCUMENTS

| 3,506,906 | A | 4/1970 | Nestor |
|---|---|---|---|
| 3,671,859 | A | 6/1972 | Miller |
| 5,680,400 | A | 10/1997 | York |
| 5,832,032 | A | 11/1998 | Overbury |
| 5,995,566 | A | 11/1999 | Rickard et al. |
| 5,995,567 | A | 11/1999 | Cioffi et al. |
| 6,052,385 | A | 4/2000 | Kanerva |
| 6,052,420 | A | 4/2000 | Yeap |
| 6,081,523 | A | 6/2000 | Merchant et al. |
| 6,121,890 | A | 8/2000 | Rao |
| 6,137,829 | A | 10/2000 | Betts |
| 6,195,360 | B1 | 2/2001 | Raza et al. |
| 6,345,071 | B1 | 2/2002 | Hamdi |
| 6,377,640 | B2 | 4/2002 | Trans |
| 6,385,315 | B1 | 5/2002 | Viadella et al. |
| 6,467,092 | B1 | 10/2002 | Geile et al. |
| 6,532,277 | B2 | 3/2003 | Ulanskas et al. |
| 6,690,739 | B1 | 2/2004 | Mui |
| 6,711,207 | B1 | 3/2004 | Amrany et al. |
| 6,734,659 | B1 | 5/2004 | Fortner |
| 6,922,448 | B1 | 7/2005 | Jacobsen et al. |
| 6,924,724 | B2 | 8/2005 | Grilo et al. |
| 6,959,056 | B2 | 10/2005 | Yeap et al. |
| 7,026,730 | B1 | 4/2006 | Marshall et al. |
| 7,027,407 | B2 | 4/2006 | Diepstraten et al. |
| 7,106,833 | B2 | 9/2006 | Kerpez |
| 7,113,491 | B2 | 9/2006 | Graziano et al. |
| 7,123,117 | B2 | 10/2006 | Chen et al. |
| 7,158,563 | B2 | 1/2007 | Ginis et al. |

(Continued)

FOREIGN PATENT DOCUMENTS

WO    WO2000/021204    4/2000

OTHER PUBLICATIONS

U.S. Appl. No. 12/977,844, filed Dec. 23, 2010, Sedarat.

(Continued)

*Primary Examiner* — Michael R Neff

(57) ABSTRACT

A method of operation for an Ethernet transceiver is disclosed. The method includes entering a fast retrain sequence of steps. The fast retrain sequence of steps includes transferring two-level symbols to a link partner; and directly following transferring of the two-level symbols, transferring multi-level symbols to the link partner, the multi-level symbols having greater than two symbol levels.

18 Claims, 3 Drawing Sheets

(56) References Cited

U.S. PATENT DOCUMENTS

| | | | |
|---|---|---|---|
| 7,200,180 B2 | 4/2007 | Verbin et al. |
| 7,315,592 B2 | 1/2008 | Tsatsanis et al. |
| 7,324,511 B2 | 1/2008 | Nishihara |
| RE40,149 E | 3/2008 | Vitenberg |
| 7,353,007 B2 | 4/2008 | Carballo et al. |
| 7,492,840 B2 | 2/2009 | Chan |
| 7,525,992 B1 | 4/2009 | Shachal |
| 7,567,620 B2 | 7/2009 | Rozental |
| 7,593,431 B1 | 9/2009 | Lo et al. |
| 7,646,699 B2 | 1/2010 | Tellado et al. |
| 7,656,956 B2 | 2/2010 | King |
| 7,664,254 B2 | 2/2010 | Bostoen et al. |
| 7,693,240 B2 | 4/2010 | Mezer |
| 7,697,408 B2 | 4/2010 | Schneider et al. |
| 7,708,595 B2 | 5/2010 | Chow et al. |
| 7,720,075 B2 | 5/2010 | Costo |
| 7,738,482 B2 | 6/2010 | Thousand et al. |
| 7,782,852 B2 | 8/2010 | Tellado et al. |
| 7,860,020 B2 | 12/2010 | Taich et al. |
| 7,936,778 B2 | 5/2011 | Ungerboeck et al. |
| 8,112,646 B2 | 2/2012 | Tsai |
| 8,196,016 B1 | 6/2012 | Langner et al. |
| 8,201,005 B2 | 6/2012 | Wertheimer et al. |
| 8,276,013 B2 | 9/2012 | Diab et al. |
| 8,284,799 B2 | 10/2012 | Diab |
| 8,320,411 B1 | 11/2012 | Sedarat et al. |
| 8,442,099 B1 | 5/2013 | Sederat |
| 8,520,562 B2 | 8/2013 | Taich et al. |
| 8,665,902 B2 | 3/2014 | Powell |
| 8,804,582 B1 | 8/2014 | Taich et al. |
| 8,804,793 B2 | 8/2014 | Wu |
| 8,804,798 B2 | 8/2014 | Malkin et al. |
| 8,854,986 B1 | 10/2014 | Langner |
| 9,001,872 B1 | 4/2015 | Farjadrad |
| 9,130,695 B1 | 9/2015 | Dalmia |
| 9,294,355 B2 | 3/2016 | Edwards |
| 9,893,756 B1 | 2/2018 | Sedarat |
| 10,069,521 B1 | 9/2018 | Farjadrad |
| 10,148,508 B1 | 12/2018 | Sedarat |
| 2002/0006167 A1 | 1/2002 | McFarland |
| 2002/0119783 A1 | 8/2002 | Bourlas et al. |
| 2002/0180547 A1 | 12/2002 | Staszewski |
| 2003/0040298 A1 | 2/2003 | Heatley |
| 2003/0156603 A1 | 8/2003 | Rakib |
| 2003/0186591 A1 | 10/2003 | Jensen et al. |
| 2003/0223505 A1 | 12/2003 | Verbin et al. |
| 2004/0023631 A1 | 2/2004 | Deutsch et al. |
| 2004/0114503 A1 | 6/2004 | Schneider et al. |
| 2004/0184810 A1 | 9/2004 | Spilman et al. |
| 2004/0239465 A1 | 12/2004 | Chen et al. |
| 2005/0025266 A1 | 2/2005 | Chan |
| 2005/0030808 A1 | 2/2005 | Brown et al. |
| 2005/0053229 A1 | 3/2005 | Tsatsanis et al. |
| 2005/0055467 A1 | 3/2005 | Campana et al. |
| 2005/0058152 A1 | 3/2005 | Oksanen et al. |
| 2005/0152466 A1 | 7/2005 | Maltsev et al. |
| 2005/0245216 A1 | 11/2005 | Boos |
| 2005/0259685 A1 | 11/2005 | Chang et al. |
| 2006/0109784 A1 | 5/2006 | Weller et al. |
| 2006/0153106 A1 | 7/2006 | Laakso et al. |
| 2006/0153307 A1 | 7/2006 | Brown et al. |
| 2006/0159186 A1 | 7/2006 | King |
| 2006/0215561 A1 | 9/2006 | Wang et al. |
| 2006/0274824 A1 | 12/2006 | Kroninger |
| 2007/0076722 A1 | 4/2007 | Ungerboeck et al. |
| 2007/0081475 A1 | 4/2007 | Telado |
| 2007/0140289 A1 | 6/2007 | Tellado et al. |
| 2007/0162818 A1 | 7/2007 | Shen et al. |
| 2007/0192505 A1 | 8/2007 | Dalmia |
| 2007/0248024 A1 | 10/2007 | Conway et al. |
| 2008/0034137 A1 | 2/2008 | Whitby-Strevens |
| 2008/0089433 A1 | 4/2008 | Cho et al. |
| 2008/0187028 A1 | 8/2008 | Lida |
| 2008/0294919 A1 | 11/2008 | Lida et al. |
| 2008/0310432 A1 | 12/2008 | Ranjan |
| 2009/0080459 A1 | 3/2009 | Barkan et al. |
| 2009/0097389 A1 | 4/2009 | Diab |
| 2009/0097401 A1 | 4/2009 | Diab |
| 2009/0097442 A1 | 4/2009 | Diab |
| 2009/0150745 A1 | 6/2009 | Langner et al. |
| 2009/0154455 A1 | 6/2009 | Diab |
| 2009/0187778 A1 | 7/2009 | Diab |
| 2009/0148161 A1 | 8/2009 | Walker |
| 2009/0282277 A1 | 11/2009 | Sedarat |
| 2010/0046543 A1 | 2/2010 | Parnaby |
| 2010/0054315 A1 | 3/2010 | Huang |
| 2010/0075704 A1 | 3/2010 | McHenry et al. |
| 2010/0111202 A1 | 5/2010 | Schley-May et al. |
| 2010/0115295 A1 | 5/2010 | Diab |
| 2010/0188980 A1 | 7/2010 | Desai et al. |
| 2010/0322105 A1 | 12/2010 | Diab |
| 2011/0051620 A1 | 3/2011 | Taich |
| 2011/0206042 A1 | 8/2011 | Rarrab |
| 2011/0249686 A1 | 10/2011 | Langner |
| 2011/0249687 A1 | 10/2011 | Diab |
| 2011/0261814 A1 | 10/2011 | Matthews |
| 2012/0063295 A1 | 3/2012 | Bliss |
| 2012/0106345 A1 | 5/2012 | Diab |
| 2012/0170591 A1 | 7/2012 | Diab et al. |
| 2012/0188894 A1 | 7/2012 | Huschke et al. |
| 2013/0070823 A1 | 3/2013 | Malkin et al. |
| 2014/0258813 A1 | 9/2014 | Lusted |

OTHER PUBLICATIONS

U.S. Appl. No. 14/961,810, Sedarat.
Ken Christense et al., IEEE 802.3az The Road to Energy Efficient Ethernet, IEEE Communications Magazine, Nov. 2010, 7 Pages.
Hugh Barrass, EEE Exchange of Management Information, IEEE 802.3az EEE Task Force, Mar. 2009, Vancouver, British Columbia, 11 Pages.
Zimmerman et al., IEEE Power Backoff, Solarflare,Teranetics, Feb. 19, 2005, 12 pages.
Zimmerman et al., IEEE Power Backoff, Mar. 15, 2005, 16 pages.
Nariman Yousefi, Multi Rate Phy, IEEE Meeting Slides, Jul. 2003, 14 pages.
Zhang et al; IEEE Apr. 2010; pp. 843-855; "An Efficient 10GBASE-T Ethernet LDPC Decoder Design with Low Error Floors".
Mankar et al.; ACEEE, Proc of Intl. Conf. on Recent Trends in Information, Telecommunication and Computing, ITC; 5 pages; "Algorithms and Architectures for Reduced Complexity LDPC Decoding".

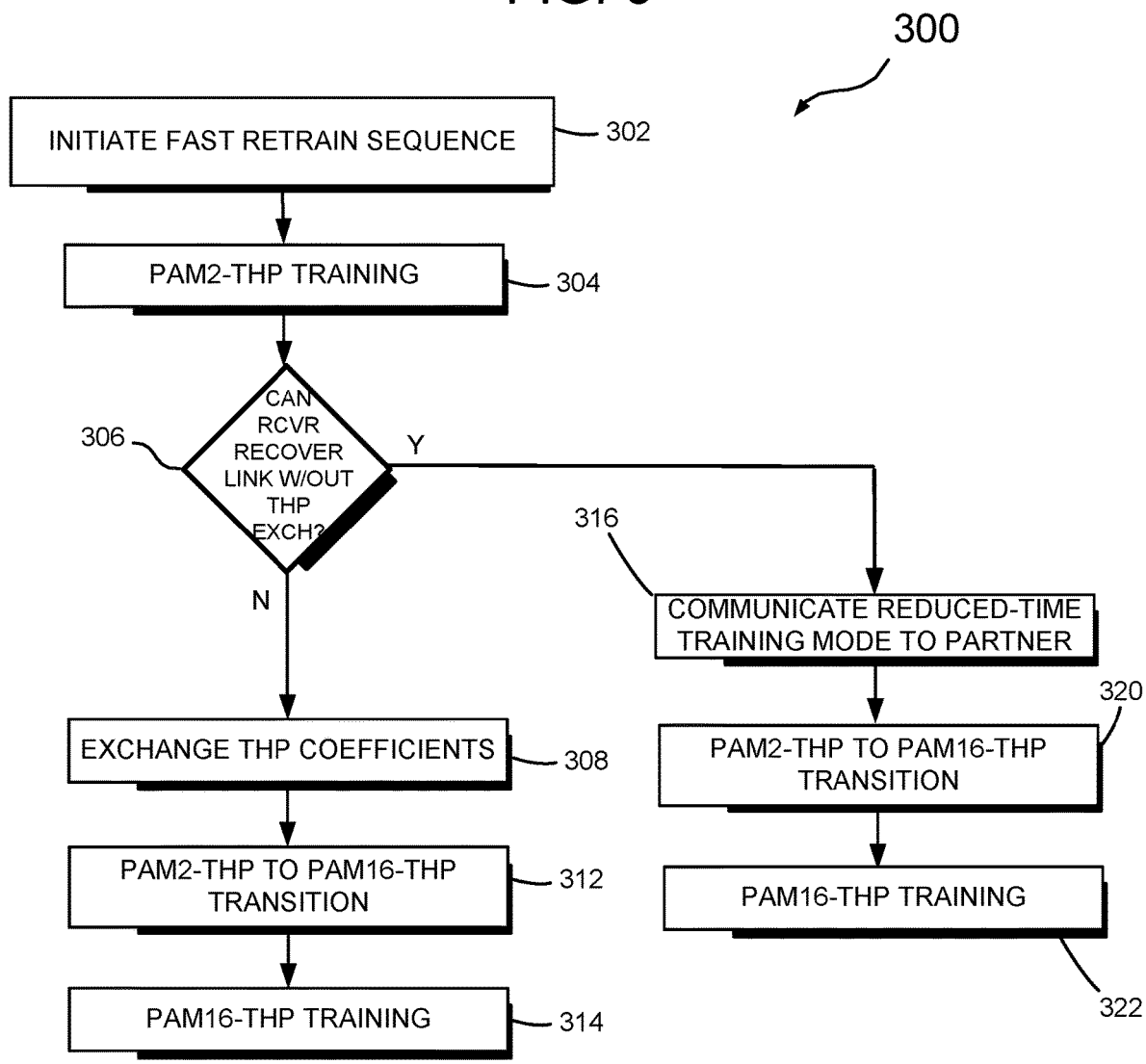

METHOD AND APPARATUS FOR EFFICIENT FAST RETRAINING OF ETHERNET TRANSCEIVERS

TECHNICAL FIELD

The disclosure herein relates to communications systems, and more specifically to high-speed Ethernet systems and methods.

BACKGROUND

Modern high-speed Ethernet protocols, such as 10GBASE-T and NBASE-T, rely on adaptive filters and digital signal processing circuitry to address noise that may affect the Ethernet link. Prior to operation of the link in an "online" mode, the link undergoes autonegotiation and a full training sequence to place the link in an initial state that's capable of overcoming the noise. While operating in the "online" mode, the link may briefly go "offline" due to extraneous alien crosstalk or other noise. Fast retrain sequences may bring the link back online in a very short period of time without the need to carry out a full training sequence.

Conventional fast retraining sequences for high-speed Ethernet links generally take approximately 30 milliseconds. For many applications, such time durations for retraining functions may be undesirable.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 3 illustrates a flow diagram of one embodiment of a method of cancelling correlated noise.

DETAILED DESCRIPTION

Figure 1:
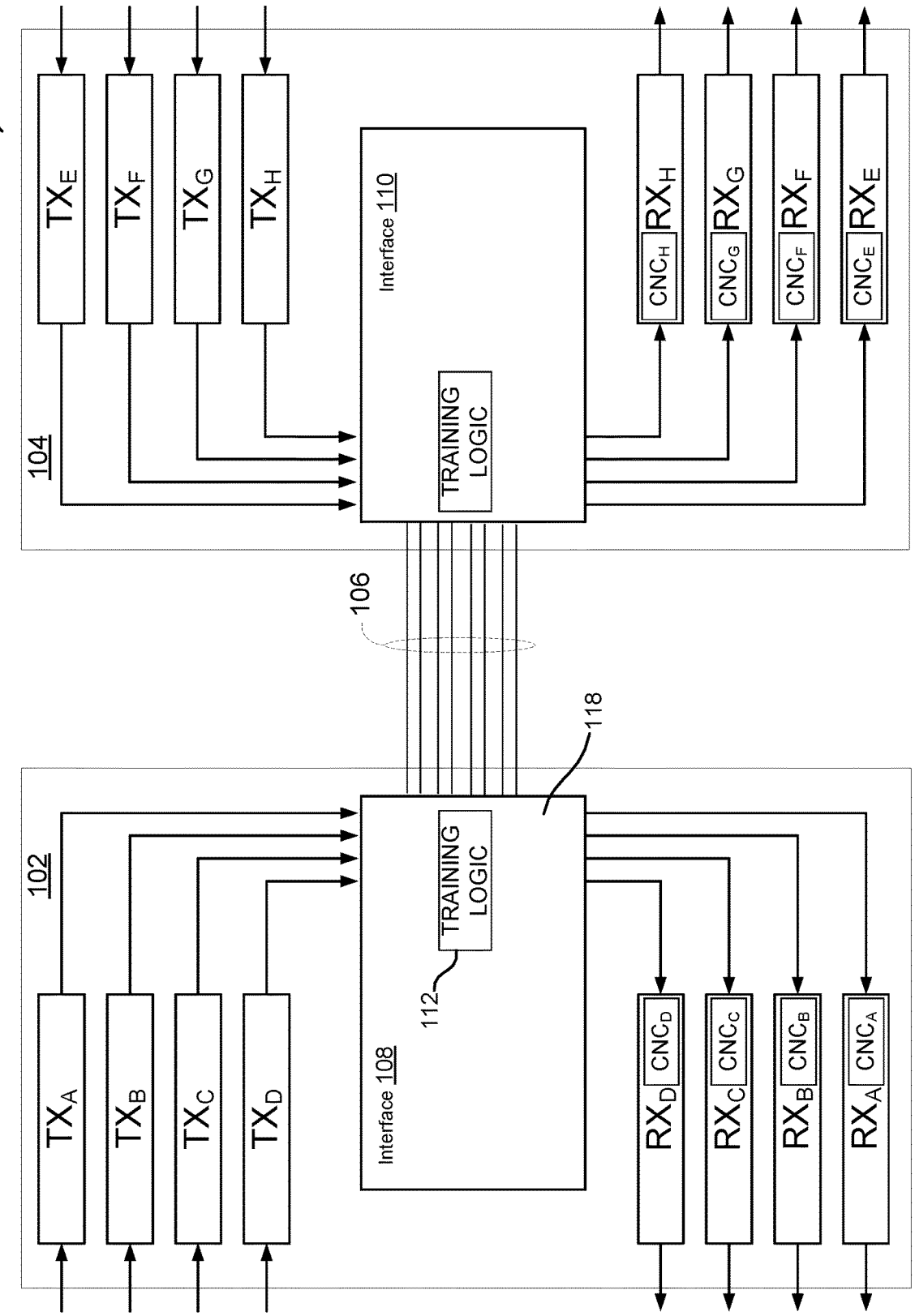
FIG. 1 illustrates a high-level transmitter/receiver (transceiver) channel architecture for an NBASE-T Ethernet transceiver.

FIG. 1 is a block diagram illustrating one embodiment of a communication system 100. The system includes a first transceiver integrated circuit (IC) or chip 102 and a second transceiver chip 104 that can communicate with each other. The first transceiver 102 includes "transceiver components" including one or more transmitters $TX_A$-$TX_D$ and one or more receivers $RX_A$-$RX_D$. Similarly, the second transceiver 104 includes various transceiver components including one or more transmitters $TX_E$-$TX_H$ and one or more receivers $RX_E$-$RX_H$. The transmitters $TX_A$-$TX_H$ shown in FIG. 1 can be considered individual "transmitters," as typically referenced herein, or can be considered individual transmitter channels which a transmitter block within the transceiver can independently transmit signals on. Similarly, receivers $RX_A$-$RX_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver which wants to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver chip 102 can communicate with the second transceiver chip 104 over one or more communication channels of a communication link 106. In one embodiment, such as one similar to the 10GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners." In accordance with the 10GBASE-T standard, the transmitters cooperate with precoders (not shown), and more specifically Tomlinson-Harashima precoders (THP) that apply THP coefficients to transmit signals to pre-compensate for channel imperfections and expected noise/distortion.

An interface 108 can be provided in the first transceiver chip 102 and an interface 110 can be provided in the second transceiver chip 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

For one embodiment, the interface 108 for each chip includes training logic 112 that manages and controls rapid retrain operations, as more fully explained below. The training logic associated with the interface 108 may be shared amongst the channels, or provided as separate resources for each of the transceiver channels.

Further referring to FIG. 1, each of the receiver circuits includes a correlated noise canceller, such as canceller $CNC_A$ for receiver $RX_A$. As more fully described below, the correlated noise cancellers enable faster retrain sequences by enabling a receive side of a link to cancel interference resulting from alien crosstalk or noise without resorting to a need for changing and exchanging precoder THP coefficients during the fast retrain sequence.

Figure 2:
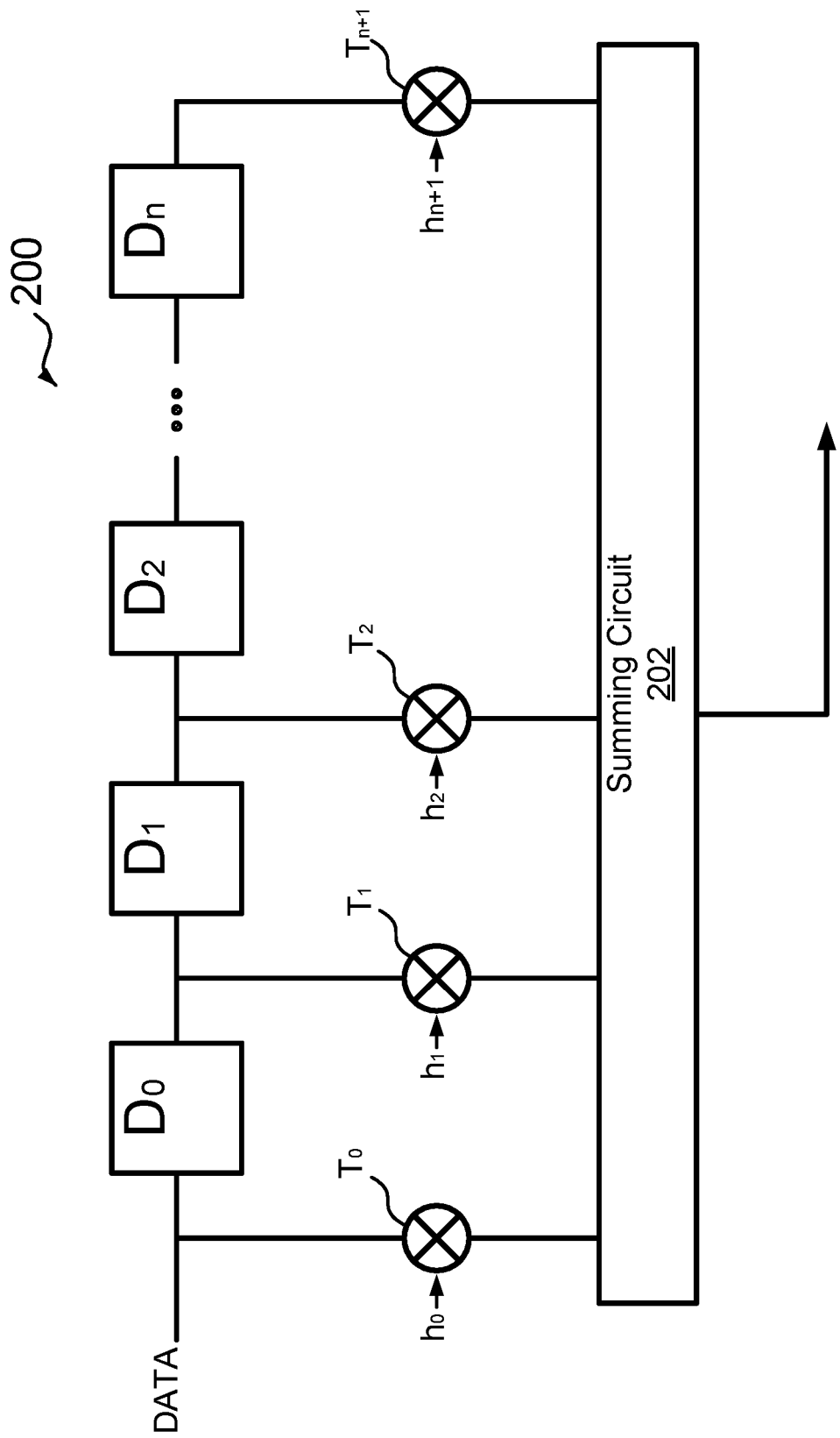
FIG. 2 illustrates one embodiment of an FIR (finite impulse response) implementation of the correlated noise canceller for use with the receiver circuits of FIG. 1.

Referring to FIG. 2, in one embodiment, each correlated noise canceller 200 is realized as an adaptive filter that continually adapts, and more particularly a finite impulse response (FIR) filter. While the structure and operation of FIR filters are generally well-known to those skilled in the art, FIG. 2 illustrates a high-level implementation that includes a plurality of delay elements D0-Dn, for delaying respective data samples. A number of taps T0-Tn corresponding to the delay elements are respectively coupled to delay output nodes. The taps receive respective weights or coefficients h0-hn+1 that represent factors applied to a sequence of data samples. A summing circuit 202 receives weighted samples, averages them, and outputs a filtered value.

The length of the adaptive filter, or number of samples to evaluate and average to determine an output, is selectable for a user depending on the application involved. Implications involving amplifier gain may warrant the use of only one sample (weighted with a gain or tap value of 1) or many samples (weighted with a corresponding number of low-gain values). Generally, however, the longer the filter, the less correlation in the noise, and correspondingly less predictability. As discussed below, high gain values may have a tendency to promote error propagation, and possibly cause filter non-convergence.

A variety of algorithms may be employed to derive values for the selected number of tap weights, or coefficients. Least mean squares (LMS) and minimum mean square error are 2 of well known algorithms. One variant to adapt the coefficients is to "regularize" the filter by utilizing a least squares algorithm, as is well-known in the art. As an example, one might use the least squares algorithm to find a solution that minimizes gain for the coefficients. Another possible algorithm to employ is the least mean squares method, which provides a leakage term that allows each adaptation step to "leak" a little bit away from the result so that the output doesn't grow too large too fast (thus, avoiding a high gain situation). In a further embodiment, the taps may have programmable saturation levels to maximize tap gain levels. Further details regarding the circuitry and function of one embodiment of a correlated noise canceller may be found in U.S. Pat. No. 8,861,663, titled "Correlated Noise Canceller For High-Speed Ethernet Receivers", filed Jan. 13, 2012, assigned to the Assignee of the present disclosure, and expressly incorporated by reference herein in its entirety.

In operation, the receiver circuits described above take advantage of the fact that correlated noise, such as that typically associated with RFI, may be predictable in many cases based on historical statistics. Thus, by sampling correlated noise over time, and assuming that the sampled noise is correlated between samples, evaluating the history of the noise may be a reliable predictor of future noise. Further, by predicting the future noise, it can be filtered/canceled from a current sample to enhance the signal fidelity of the system. Note that the use of the term "cancellation" is not meant to require a complete cancellation of a target signal, but rather a significant mitigation or reduction of the target signal that provides the advantages noted herein.

Referring now to FIG. 3, one embodiment of a fast retrain method, generally designated 300, provides multiple fast retrain modes of operation in an Ethernet transceiver that can enable a fast link recovery for a link affected by a change in noise or some other undesirable distortion characteristic. In response to detecting a drop in link quality, such as a minimum SNR or rate of LDPC error frames or other LDPC statistics, a fast retrain sequence may be initiated, at 302. As noted above, a fast retrain is a brief link training sequence that resets a minimal number of link parameters to allow for changes in link parameters without necessarily requiring the link to go offline for a full auto-negotiation and training cycle, which may take a few seconds.

Further referring to FIG. 3, in one embodiment, the fast retrain sequence may first provide a PAM2-THP transmission sequence, at 304. During the PAM2-THP sequence, a PAM-2 training signal is transmitted with precoding, using appropriate coefficients and other parameters. The precoding applied to the PAM-2 signal allows the far-end receiver to retune its filters for the potential difference between optimal operating points with and without the precoding, so that the same adaptation can be used during normal transmission. For some embodiments, the PAM2-THP step may be omitted entirely, such as disclosed in copending U.S. patent application Ser. No. 16/362,479; titled "RAPID TRAINING METHOD FOR HIGH-SPEED ETHERNET", filed Mar. 22, 2019, assigned to the Assignee of the present disclosure, and expressly incorporated herein by reference in its entirety. Following the PAM2-THP sequence, a determination may be made as to whether the receiver can recover the link by itself, without a THP coefficient exchange, at 306. The determination may be based on an evaluation of how far off the new precoder coefficients are from prior coefficients, and so forth.

With continued reference to FIG. 3, in the case where the receiver cannot recover the link by itself, then newly updated THP coefficients may be exchanged between link partners and the receiver synchronized with precoded transmission data from the far-end link partner transmitter, at 308. In other embodiments, other signal types, modulations, or formats can be used for training signals as appropriate.

Further referring to FIG. 3, following the THP coefficient exchange, a transition period occurs, at 312, to allow the link to transition from transmitting the precoded PAM-2 signals, to transmitting a multi-PAM type of signal having characteristics more closely resembling those actually used during nominal operation, such as a PAM-16 or DSQ128 signal. After the transition period, actual PAM-16 training signals encoded with the THP coefficients, and modulated via a DSQ128 type of modulation may be transmitted, at 314. After sending the PAM-16 training signal for an appropriate time to adapt the filters, equalizers, timing, and other components, the training sequence ends and normal operation begins, in which actual data is transmitted and received over the link as PAM-16 signals.

While the "legacy" fast retrain mode described above works well for its intended applications, the time expended to carry out the coefficient exchange step at 308 may take up a significant portion of the timing budget allotted to each fast retrain sequence.

With the above in mind, should the receiver be able to recover the link by itself, at step 306, one embodiment provides for a reduced-processing fast retrain mode, beginning at 316, that omits the legacy THP coefficient exchange step. This is possible due to the filtering activities of the correlated noise cancellers, which are receive-side adaptive filters that do not utilize transmit-side THP coefficients. This results in a significant training time reduction. Note that in some embodiments, a separate "legacy" mode of fast retraining may not be provided as a separate mode from the reduced-processing training mode.

With further reference to FIG. 3, for some embodiments, and after confirming that the signal quality meets a certain threshold, a communication between link partners in the reduced-processing training mode is carried out, at 316. This is carried out so that the partners are synchronized in knowing that the reduced-processing fast retrain mode will be followed, instead of the legacy mode. This communication may be made by, for example, an InfoField protocol that includes one or more bits flagging use of the reduced-processing training mode.

Following the communication step, at 316, and an associated transition time, at 320, the reduced-processing mode goes straight to a PAM-16THP step, at 322, to run a training sequence of THP-encoded PAM-16 signals.

By eliminating the THP coefficient exchange step, a fast retrain sequence may be shortened significantly. Since fast retrains may occur often during normal operation of the link, repetitive fast retrain sequences of shorter duration saves appreciable time.

Those skilled in the art will appreciate the benefits and advantages provided by the embodiments described herein. Reducing fast retraining steps for high speed Ethernet transceivers minimizes link downtime while improving processing efficiency.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '$\overline{\text{<signalname>}}$') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of operation for an Ethernet transceiver, the method comprising:
    entering a fast retrain sequence of steps, the fast retrain sequence of steps including
        transferring two-level symbols to a link partner without transferring Tomlinson-Harashima Precoder (THP) coefficient information; and
        directly following transferring of the two-level symbols, transferring multi-level symbols to the link partner, the multi-level symbols having greater than two symbol levels.

2. The method according to claim 1, wherein the transferring two-level symbols to a link partner comprises:
    selectively transferring uncoded two-level symbols to a link partner; and
    selectively transferring coded two-level symbols to the link partner.

3. The method according to claim 2, wherein the coded two-level symbols are encoded in accordance with Tomlinson-Harashima Precoder (THP) coefficients.

4. The method according to claim 1, further comprising:
    informing the link partner to proceed directly to transferring the multi-level symbols following the transferring of the two-level symbols.

5. The method according to claim 4, wherein the informing is carried out via an InfoField protocol.

6. The method according to claim 1, wherein:
    the two-level symbols comprise PAM-2 symbols; and
    the multi-level symbols comprise PAM-16 symbols.

7. The method according to claim 1, further comprising:
    during the fast retrain sequence of steps, cancelling correlated noise received by a receiver with a correlated noise canceller.

8. An integrated circuit (IC) Ethernet transceiver chip comprising:
    receiver circuitry including correlated noise canceller circuitry; and
    training logic to control a fast retrain sequence, the fast retrain sequence including
        a transfer of uncoded two-level symbols to a link partner;
        a transfer of coded two-level symbols to the link partner following the transfer of the uncoded two-level symbols without transferring Tomlinson-Harashima Precoder (THP) coefficient information; and
        directly following the transfer of the coded two-level symbols, the training logic to control a transfer of multi-level symbols to the link partner, the multi-level symbols having greater than two symbol levels.

9. The IC Ethernet transceiver chip of claim 8, wherein the transfer of two-level symbols comprises:
   a transfer of uncoded two-level symbols to a link partner; and
   a transfer of coded two-level symbols to the link partner.

10. The IC Ethernet transceiver chip according to claim 9, wherein:
    the coded two-level and multi-level symbols are encoded in accordance with a Tomlinson-Harashima Precoder (THP) encoding.

11. The IC Ethernet transceiver chip according to claim 8, wherein:
    the two-level symbols comprise PAM-2 symbols; and
    the multi-level symbols comprise PAM-16 symbols.

12. The IC Ethernet transceiver chip according to claim 8, realized as an NGBASE-T IC Ethernet transceiver chip.

13. A method of operation for an Ethernet transceiver, the method comprising:
    for a first mode of operation, performing a training sequence by
       transferring two-level symbols to a link partner; and
       directly following transferring of the two-level symbols, transferring multi-level symbols to the link partner, the multi-level symbols having greater than two symbol levels; and
    for a second mode of operation, performing the training sequence by
       transferring uncoded two-level symbols to a link partner;
       exchanging updated precoder coefficients with the link partner,
       transferring coded two-level symbols to the link partner, the coding consistent with the updated precoder coefficients, and
       transferring multi-level symbols to the link partner, the multi-level symbols encoded consistent with the exchanged updated precoder coefficients and having greater than two symbol levels.

14. The method according to claim 13, wherein for the first mode of operation, the transferring two-level symbols to a link partner comprises:
    selectively transferring uncoded two-level symbols to a link partner; and
    selectively transferring coded two-level symbols to the link partner.

15. The method according to claim 13, wherein a selection between using the first mode of operation or the second mode of operation is based on a signal quality parameter.

16. The method according to claim 13, wherein the precoder encoding comprises:
    a Tomlinson-Harashima Precoder (THP) encoding.

17. The method according to claim 13, wherein the first mode of operation further comprises:
    informing the link partner to proceed directly to transferring the multi-level symbols following the transferring of the coded two-level symbols to the link partner.

18. The method according to claim 17, wherein the informing is carried out via an InfoField protocol.

* * * * *